US012753734B2

(12) United States Patent
Hagiwara et al.

(10) Patent No.: US 12,753,734 B2
(45) Date of Patent: Oct. 6, 2026

(54) ENGINE CONTROL APPARATUS

(71) Applicant: SUBARU CORPORATION, Tokyo (JP)

(72) Inventors: Naonori Hagiwara, Tokyo (JP); Kenshin Arimoto, Tokyo (JP); Takayuki Matsumoto, Tokyo (JP); Masashi Touyama, Tokyo (JP); Yuma Suzuki, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 19/267,744

(22) Filed: Jul. 14, 2025

(65) Prior Publication Data

US 2026/0071602 A1 Mar. 12, 2026

(30) Foreign Application Priority Data

Sep. 6, 2024 (JP) ................................ 2024-154241

(51) Int. Cl.
*F02P 5/15* (2006.01)
*F01M 1/16* (2006.01)

(52) U.S. Cl.
CPC ............ *F02P 5/1502* (2013.01); *F01M 1/16* (2013.01); *F01M 2250/60* (2013.01)

(58) Field of Classification Search
CPC ..... F02P 5/1502; F01M 1/16; F01M 2250/60; Y02T 10/40
See application file for complete search history.

(56) References Cited

FOREIGN PATENT DOCUMENTS

| | | | | | |
|---|---|---|---|---|---|
| CN | 1580533 A | * | 2/2005 | ............ | F16N 29/02 |
| CN | 101059100 A | * | 10/2007 | ............. | F02P 5/152 |
| JP | 2009031068 A | * | 2/2009 | | |
| JP | 2020-008010 A | | 1/2020 | | |

* cited by examiner

*Primary Examiner* — Hung Q Nguyen
(74) *Attorney, Agent, or Firm* — Rimon P.C.

(57) ABSTRACT

An engine control apparatus includes an oil film thickness acquirer and a processor. The oil film thickness acquirer is configured to determine a thickness of an oil film on an inner surface of each of cylinders of an engine. The processor is configured to make a correction of an ignition timing of each of the cylinders in accordance with the determined thickness of the oil film of each of the cylinders.

6 Claims, 6 Drawing Sheets

ENGINE CONTROL APPARATUS

CROSS-REFERENCE TO RELATED APPLICATIONS

The present application claims priority from Japanese Patent Application No. 2024-154241 filed on Sep. 6, 2024, the entire contents of which are hereby incorporated by reference.

BACKGROUND

The disclosure relates to an engine control apparatus.

In a vehicle using an engine as a driving force source, for example, noise and vibration caused by the engine are generated in association with running or operation of the engine. In the following, the noise and vibration may also be referred to as "NV". Meanwhile, quietness of the vehicle, i.e., NV performance is an advantageous factor for comfort as well as for merchantability of the vehicle.

Thus, to improve the quietness of the vehicle, for example, a countermeasure for a piston-hitting sound has been adopted to achieve an improvement in quietness of an engine body. For example, reference is made to Japanese Unexamined Patent Application Publication No. 2020-008010.

SUMMARY

An aspect of the disclosure provides an engine control apparatus. The engine control apparatus includes an oil film thickness acquirer and a processor. The oil film thickness acquirer is configured to determine a thickness of an oil film on an inner surface of each of cylinders of an engine. The processor is configured to make a correction of an ignition timing of each of the cylinders in accordance with the determined thickness of the oil film of each of the cylinders.

An aspect of the disclosure provides an engine control apparatus. The engine control apparatus includes circuitry. The circuitry is configured to determine a thickness of an oil film on an inner surface of each of cylinders of an engine, and make a correction of an ignition timing of each of the cylinders in accordance with the determined thickness of the oil film of each of the cylinders.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
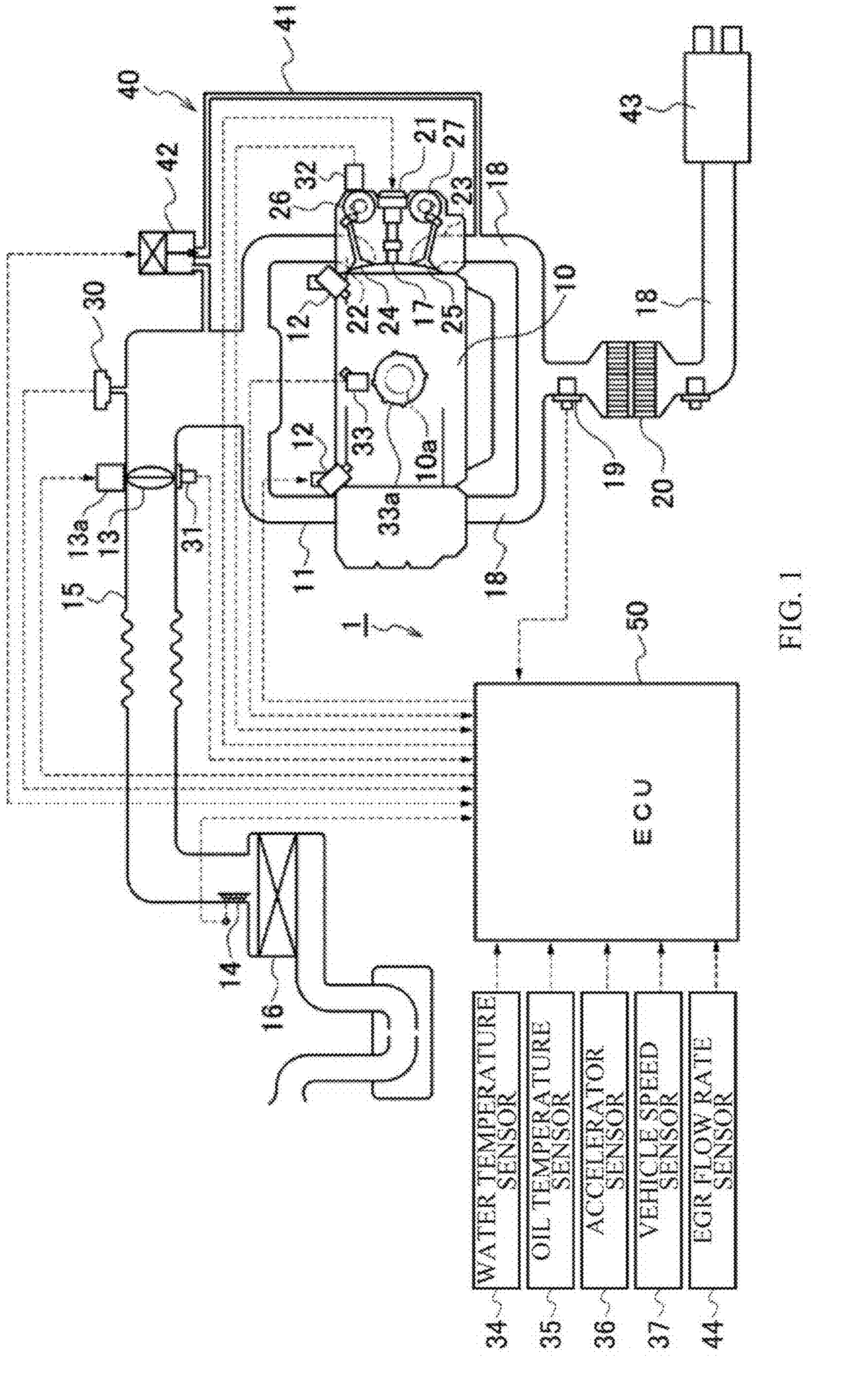
FIG. 1 is a diagram illustrating configurations of an engine control apparatus according to one example embodiment and an engine to which the engine control apparatus is applied.

In recent years, regulations on vehicle exterior noise such as R51-03 phase 3, for example, have been tightened. To address such tightened regulations as well as to further improve merchantability mentioned above, it has been desired to further reduce noise and vibration, or NV, of an engine body. That is, it has been desired to further improve quietness of the engine body.

It is desirable to provide an engine control apparatus that helps to further reduce noise and vibration, or NV, of an engine body, i.e., that helps to further improve quietness of the engine body.

In the following, some example embodiments of the disclosure are described in detail with reference to the accompanying drawings.

Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

First Example Embodiment

Now, a description is given of a configuration of an engine control apparatus 1 according to a first example embodiment with reference to FIG. 1. FIG. 1 is a diagram illustrating configurations of the engine control apparatus 1 and an engine 10 to which the engine control apparatus 1 is applied.

The engine 10 may be of any type. For example, the engine 10 may be a horizontally opposed four-cylinder gasoline engine. In addition, the engine 10 may be an in-cylinder injection engine that directly injects fuel into a cylinder. In the engine 10, air taken in from an air cleaner 16 may be squeezed by an electronically controlled throttle valve 13 provided in an intake pipe 15, may pass through an intake manifold 11, and may be taken in by each of cylinders formed in the engine 10. In the following, the electronically controlled throttle valve may also be simply referred to as a "throttle valve". An amount of air taken in from the air cleaner 16 may be detected by an air flow meter 14 disposed between the air cleaner 16 and the throttle valve 13. A vacuum sensor 30 may be disposed inside a collector part, i.e., a surge tank constituting the intake manifold 11. The vacuum sensor 30 may detect a pressure in the intake manifold 11, or an intake manifold pressure. Further, the throttle valve 13 may be provided with a throttle opening sensor 31. The throttle opening sensor 31 may detect an opening position of the throttle valve 13.

In a cylinder head, an intake port 22 and an exhaust port 23 are formed for each of the cylinders. FIG. 1 illustrates only one bank. The intake port 22 and the exhaust port 23 may respectively be provided with an intake valve 24 and an exhaust valve 25. The intake valve 24 may open and close the intake port 22, and the exhaust valve 25 may open and close the exhaust port 23. A variable valve timing mechanism 26 may be disposed between an intake cam shaft and an intake cam pulley. The intake cam shaft and the intake cam pulley may drive the intake valve 24. The variable valve timing mechanism 26 may relatively rotate the intake cam pulley and the intake cam shaft to continuously change a rotational phase, i.e., a displacement angle of the intake cam shaft with respect to a crankshaft 10*a*. The variable valve timing mechanism 26 may then cause a valve timing, i.e., opening and closing timings of the intake valve 24 to be advanced or retarded. The variable valve timing mechanism 26 may variably set the opening and closing timings of the intake valve 24 in accordance with an engine-running state.

Likewise, a variable valve timing mechanism 27 may be disposed between an exhaust cam pulley and an exhaust cam shaft. The variable valve timing mechanism 27 may relatively rotate the exhaust cam pulley and the exhaust cam shaft to continuously change a rotational phase, i.e., a displacement angle of the exhaust cam shaft with respect to the crankshaft 10*a*. The variable valve timing mechanism 27 may then cause a valve timing, i.e., opening and closing timings of the exhaust valve 25 to be advanced or retarded. The variable valve timing mechanism 27 may variably set the opening and closing timings of the exhaust valve 25 in accordance with an engine-running state.

An injector 12 may be attached to each of the cylinders of the engine 10. The injector 12 may inject fuel into the cylinder. The injector 12 may directly inject fuel pressurized by an unillustrated high-pressure fuel pump into a combustion chamber of each of the cylinders.

An ignition plug 17 and an igniter-containing coil 21 may be attached to the cylinder head of each of the cylinders. The ignition plug 17 may ignite an air-fuel mixture. The igniter-containing coil 21 may apply a high voltage to the ignition plug 17. In each of the cylinders of the engine 10, the air-fuel mixture of air taken in and the fuel injected by the injector 12 may be ignited by the ignition plug 17 to be combusted. An exhaust gas having been combusted may be exhausted through an exhaust pipe 18.

An air-fuel ratio sensor 19 may be mounted downstream of an interflow of the exhaust pipe 18 and upstream of an exhaust purifying catalyst 20. As the air-fuel ratio sensor 19, a linear air-fuel ratio sensor or an LAF sensor may be used. The linear air-fuel ratio sensor or the LAF sensor may be able to output a signal corresponding to an oxygen concentration and an uncombusted gas concentration in the exhaust gas, i.e., a signal corresponding to an air-fuel ratio of the air-fuel mixture and thus to linearly detect the air-fuel ratio.

The exhaust purifying catalyst 20 may be disposed downstream of the air-fuel ratio sensor 19. The exhaust purifying catalyst 20 may be a three-way catalyst. The exhaust purifying catalyst 20 may oxidize hydrocarbon (HC) and carbon monoxide (CO) and may reduce nitrogen oxide (NOx) simultaneously in the exhaust gas to purify harmful gas components in the exhaust gas into harmless components: carbon dioxide ($CO_2$), water vapor ($H_2O$), and nitrogen ($N_2$). A muffler 43 may be mounted downstream of the exhaust purifying catalyst 20. The exhaust purifying catalyst 20 may reduce exhaust noise.

The exhaust pipe 18 may be provided with an exhaust gas recirculation device 40. In the following, the exhaust gas recirculation device is referred to as an "EGR device", and the "EGR" is an abbreviation of "Exhaust Gas Recirculation". The EGR device 40 may recirculate a part of the exhaust gas exhausted from the engine 10 to the intake pipe 15 of the engine 10. The EGR device 40 may include EGR piping 41 and an EGR valve 42. The EGR piping 41 may cause the exhaust pipe 18 and the intake pipe 15 of the engine 10 to be in communication with each other. The EGR valve 42 may be disposed on the EGR piping 41, and may regulate an amount of the recirculation of the exhaust gas, i.e., an EGR flow rate.

An EGR flow rate sensor 44 may be attached to the EGR valve 42 or the EGR piping 41. The EGR flow rate sensor 44 may detect the amount of the recirculation of the exhaust gas or the EGR flow rate. As the EGR flow rate sensor 44, for example, a flow rate sensor that outputs an electric signal, or a voltage, e.g., corresponding to a rotational angle, i.e., a valve opening position of the EGR valve 42, or a valve shaft, may be suitably used. Further, as the EGR flow rate sensor 44, for example, a hot wire mass flowmeter may be suitably used. The hot wire mass flowmeter may detect a mass flow rate of the exhaust gas, or an EGR gas, flowing through the EGR piping 41.

An opening position, or EGRSTP, of the EGR valve 42 may be controlled by an ECU 50 described later in accordance with a running state of the engine 10, e.g., in accordance with an engine revolving speed, an intake air amount. In some embodiments, for example, an EEPROM, or an Electrically Erasable Programmable Read-Only Memory, of the ECU 50 may store, in advance, a target EGR valve opening position map that defines a relationship among the engine revolving speed, the intake air amount, and a target EGR valve opening position. The target EGR valve opening position may be determined by the engine revolving speed and the intake air amount on a real-time basis. The EGR valve 42 may be controlled or feedback controlled to allow an actual EGR valve opening position and the target EGR valve opening position to coincide with each other.

In addition to the air flow meter 14, the air-fuel ratio sensor 19, the vacuum sensor 30, the throttle opening sensor 31, and the EGR flow rate sensor 44 described above, a cam angle sensor 32 may be attached to a vicinity of a camshaft of the engine 10. The cam angle sensor 32 may determine a cylinder of the engine 10. A crank angle sensor 33 may be attached to a vicinity of the crankshaft 10*a* of the engine 10. The crank angle sensor 33 may detect a rotational position of the crankshaft 10*a*. For example, a timing rotor 33*a* may be attached to an end of the crankshaft 10*a*. The timing rotor 33*a* may have 34 projections being formed at an interval of 10 degrees, with two projections missing. The crank angle sensor 33 may detect presence or absence of the projections of the timing rotor 33*a* to thereby detect the rotational position of the crankshaft 10*a*. As the cam angle sensor 32 and the crank angle sensor 33, for example, an electromagnetic pickup sensor may be used.

These sensors may be coupled to the ECU 50. Further, various sensors such as a water temperature sensor 34, an oil temperature sensor 35, an accelerator sensor 36, and a vehicle speed sensor 37 may be coupled to the ECU 50. The water temperature sensor 34 may detect a temperature of a coolant of the engine 10. The oil temperature sensor 35 may detect a temperature of a lubricant or oil. The accelerator sensor 36 may detect an amount of depression of an accelerator pedal, i.e., an amount of operation of the accelerator pedal. The vehicle speed sensor 37 may detect a speed of a vehicle.

The ECU 50 may include a microprocessor, an EEPROM, a RAM, a backup RAM, and an input/output interface. The microprocessor may perform an arithmetic operation. The EEPROM may store, for example, a program that causes the microprocessor to execute each processing. The RAM may store various types of data such as a result of the arithmetic operation. The backup RAM may hold a content of the storage using a battery, for example. The ECU 50 may further include, for example, an injector driver, an output circuit, a motor driver, and a driver circuit. The injector driver may drive the injector 12. The output circuit may output an ignition signal. The motor driver may drive an electric motor 13*a*. The electric motor 13*a* may open and close the electronically controlled throttle valve 13. The driver circuit may drive the EGR valve 42.

The ECU 50 may acquire various types of data based on detection signals inputted from the various sensors described above. The various types of data may include an intake air amount, an intake pipe negative pressure, an accelerator operation amount, an air-fuel ratio of an air-fuel mixture, and a water temperature or an oil temperature of the engine 10. The ECU 50 may determine a cylinder from an output of the cam angle sensor 32, and may determine a rotational angular velocity and an engine revolving speed from an output of the crank angle sensor 33. The ECU 50 may further determine, from the output of the crank angle sensor 33, a crank angular velocity corresponding to an expansion process of each of the cylinders. Examples of the crank angular velocity corresponding to the expansion process of each of the cylinders may include a crank angular velocity (degree per second) during 180 degrees, i.e., 720/4 in a case of a four-cylinder engine. The ECU 50 may further determine an engine load (Nm) from the intake air amount (and from the engine revolving speed).

The ECU 50 may control, based on the acquired various types of data, a fuel injection amount, an ignition timing, and various devices such as the throttle valve 13 and the EGR valve 42 to thereby comprehensively control the engine 10. In one embodiment, the ECU 50 may serve as a “processor”.

The ECU 50 may serve to further reduce noise and vibration, or the NV, of a body of the engine 10. That is, the ECU 50 may serve to further improve quietness of the body of the engine 10. The ECU 50 achieves the above-described further reduction in noise and vibration, i.e., the above-described further improvement in quietness of the body of the engine 10 by causing the microprocessor to execute a program stored in the EEPROM, for example.

Figure 2:
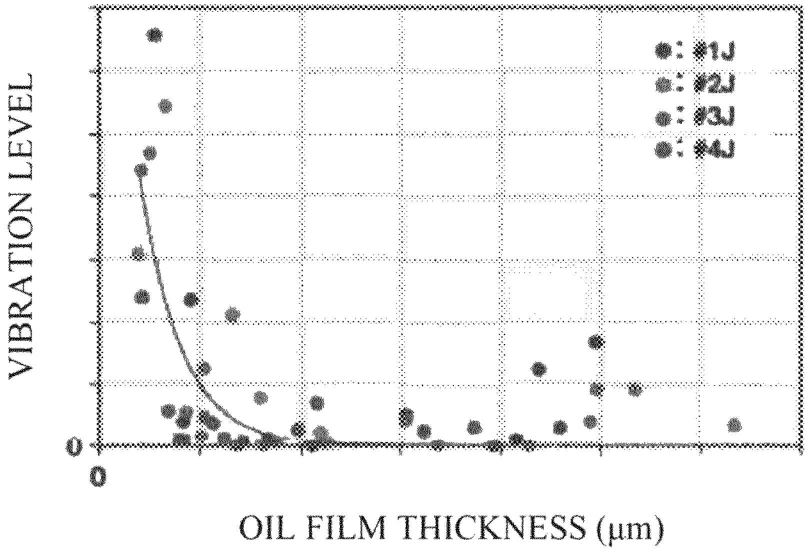
FIG. 2 is a diagram illustrating a relationship between a thickness of an oil film and a vibration level.

Incidentally, a thickness of an oil film, i.e., a film thickness of oil on an inner circumferential surface of the cylinder and an NV level of the engine 10 may be correlated with each other. As illustrated in FIG. 2, when the thickness of the oil film, i.e., the film thickness of oil becomes thinner than a predetermined value of, e.g., about 4 micrometers to about 6 micrometers, the NV may tend to rapidly deteriorate or increase. When a dispersion of the oil film thickness between cylinders exists or increases, the NV may tend to deteriorate. Note that FIG. 2 is a diagram illustrating a relationship between the oil film thickness and a vibration level. In FIG. 2, the horizontal axis indicates the oil film thickness (μm), and the vertical axis indicates the vibration level.

Accordingly, the ECU 50 may first determine the thickness of the oil film on the inner surface of each of the cylinders formed in the engine 10. In one embodiment, the ECU 50 may serve as an “oil film thickness acquirer”.

In some embodiments, the ECU 50 may estimate an oil film thickness of each of the cylinders based on a crank angular velocity corresponding to an expansion process of each of the cylinders, an engine load, and an oil temperature, for example.

A description is now given of a method of determining, i.e., a method of estimating an oil film thickness of each of the cylinders. For example, the EEPROM of the ECU 50 may store an oil film thickness map, i.e., a look-up table that defines a relationship among a crank angular velocity corresponding to the expansion process, an engine load, an oil temperature, and an oil film thickness. The oil film thickness map may be retrieved based on the crank angular velocity corresponding to the expansion process of each of the cylinders, the engine load, and the oil temperature, thereby allowing for acquisition of the oil film thickness of each of the cylinders.

In the oil film thickness map, the oil film thickness is given, or set, for each of combinations, i.e., for each of lattice points among the crank angular velocity, the engine load, and the oil temperature. The oil film thickness may be given or set to allow: the oil film thickness to be thinner as the crank angular velocity increases; the oil film thickness to be thinner as the engine load increases; and the oil film thickness to be thinner as the oil temperature increases. Note that data of the oil film thickness map may be obtained by an engine bench test, for example.

Accordingly, the ECU 50 may estimate that: the oil film thickness is thinner as the crank angular velocity increases; the oil film thickness is thinner as the engine load increases; and the oil film thickness is thinner as the oil temperature increases.

The ECU 50 may then correct an ignition timing of each of the cylinders in accordance with the determined oil film thickness of each of the cylinders. Note that a basic ignition timing may be set based on an engine revolving speed and an intake air amount, for example.

In some embodiments, the ECU 50 may correct an ignition timing of a cylinder having an oil film thickness thinner than a predetermined value of, e.g., 4 micrometers to 6 micrometers to be advanced. At that time, for example, the ECU 50 may correct the ignition timing to be advanced, i.e., may increase a correction amount, as the oil film thickness becomes thinner. Note that the ignition timing may be corrected to be retarded for a cylinder having an oil film thickness thicker than a predetermined value, which may be provided with hysteresis, for example.

As described above, the ECU 50 may correct the ignition timing of the cylinder having an oil film thickness thinner than a predetermined value to be advanced, thus increasing torque of the cylinder and eliminating dispersion, between cylinders, of force to depress a piston. This reduces noise and vibration of the body of the engine 10.

Figure 3:
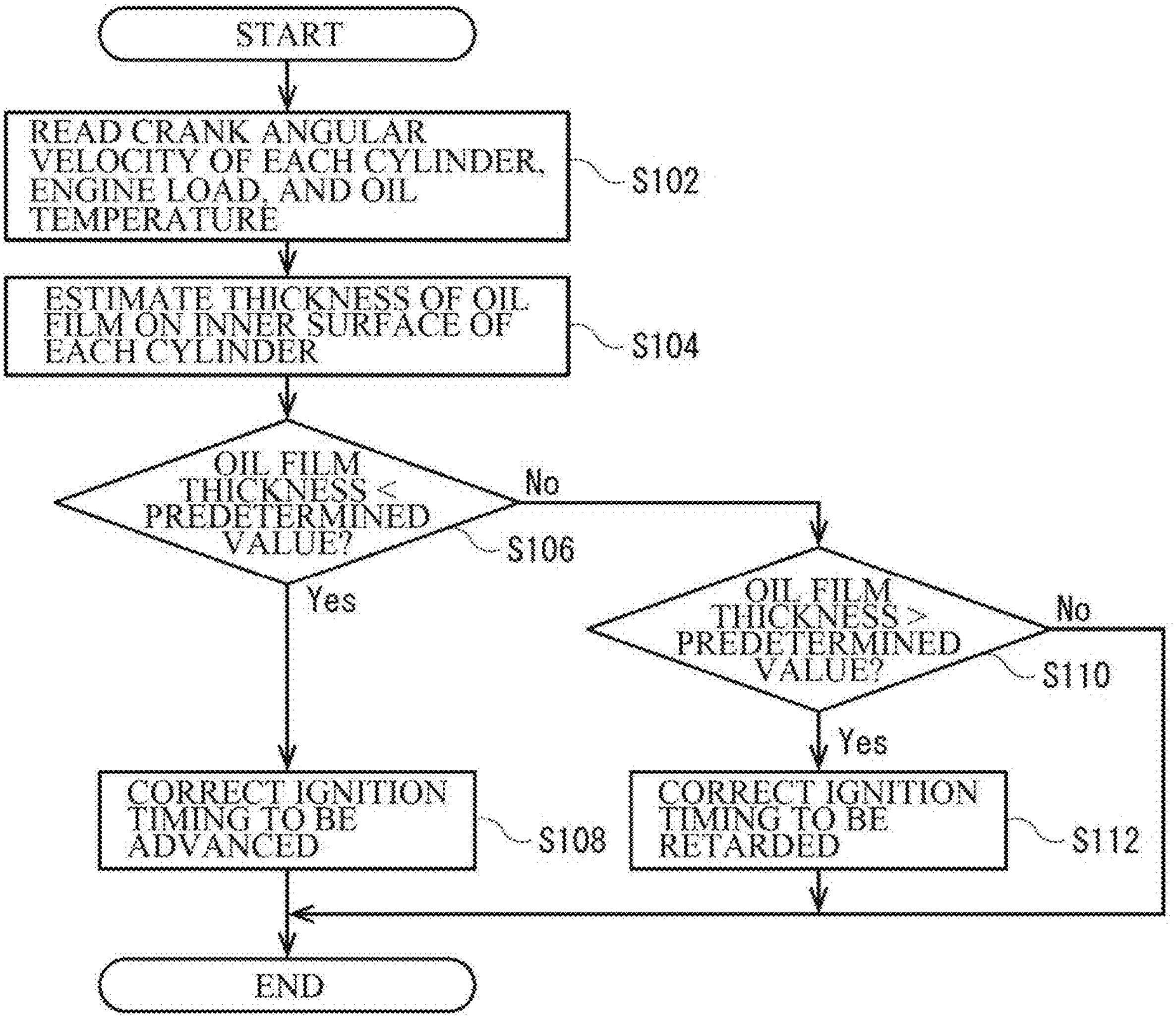
FIG. 3 is a flowchart illustrating a processing procedure of NV reduction control to be performed by the engine control apparatus illustrated in FIG. 1

Now, a description is given of an operation of the engine control apparatus 1 with reference to FIG. 3. FIG. 3 is a flowchart illustrating a processing procedure of NV reduction control to be performed by the engine control apparatus 1. The processing may be repeatedly executed in the ECU 50 at a predetermined timing.

First, in step S102, a crank angular velocity of each of the cylinders, an engine load, and an oil temperature may be read.

Thereafter, in step S104, an oil film thickness of each of the cylinders may be estimated based on the crank angular velocity for each of the cylinders, the engine load, and the oil temperature, which are read. Note that the method of estimating the oil film thickness is as described above, and thus a detailed description thereof is omitted here.

Thereafter, in step S106, a determination may be made as to whether there is a cylinder having an oil film thickness thinner than a predetermined value. If there is no cylinder having an oil film thickness less than the predetermined value (S106: N), the processing may proceed to step S110. If there is a cylinder having an oil film thickness less than the predetermined value (S106: Y), the processing may proceed to step S108.

In step S108, an ignition timing of the cylinder having an oil film thickness less than the predetermined value may be corrected to be advanced. Thereafter, the flow may exit temporarily from the processing.

In step S110, a determination may be made as to whether there is a cylinder having an oil film thickness thicker than a predetermined value, which is provided with hysteresis. If there is no cylinder having an oil film thickness thicker than the predetermined value (S110: N), the flow may exit temporarily from the processing. If there is a cylinder having an oil film thickness thicker than the predetermined value (S110: Y), the processing may proceed to step S112.

In step S112, an ignition timing of the cylinder having an oil film thickness thicker than the predetermined value may be corrected to be retarded. Thereafter, the flow may exit temporarily from the processing.

Incidentally, when there is a cylinder having an oil film thickness thinner than a predetermined value and there is a dispersion or a large dispersion of oil film thicknesses of respective cylinders, there may occur a dispersion, between the cylinders, to depress a piston, i.e., the piston may not revolve smoothly, leading to a tendency that the NV may deteriorate.

According to the example embodiment, the oil film thickness of each of the cylinders may be determined, and the ignition timing of each of the cylinders may be corrected in accordance with the oil film thickness of each of the cylinders to allow output torque of each of the cylinders to be finely adjusted. This eliminates the dispersion, between the cylinders, of the force to depress the piston. That is, the piston revolves more smoothly. The noise and the vibration, or the NV, of the body of the engine 10 are thus reduced.

As a result, this configuration helps to further reduce the noise and the vibration, or the NV, of the body of the engine 10, i.e., to further improve quietness of the body of the engine 10.

In some embodiments, the ignition timing of a cylinder having an oil film thickness thinner than a predetermined value may be corrected to be advanced. That is, the force to depress the piston of the cylinder may be increased. Accordingly, the dispersion, between the cylinders, of the force to depress the piston may be eliminated with good response, which helps to reduce the noise and the vibration, or the NV, of the body of the engine 10 more quickly, i.e., to improve quietness of the body of the engine 10 more quickly.

In some embodiments, the oil film thickness of each of the cylinders may be estimated based on the crank angular velocity corresponding to the expansion process of each of the cylinders, the engine load, and the oil temperature. This helps to accurately estimate the oil film thickness of each of the cylinders.

In some embodiments, according to the example embodiment, the oil film thickness may be estimated to be thinner as the crank angular velocity increases; the oil film thickness may be estimated to be thinner as the engine load increases; and the oil film thickness may be estimated to be thinner as the oil temperature increases. This helps to estimate the oil film thickness of each of the cylinders more accurately.

Second Example Embodiment

In the engine control apparatus 1 according to the first example embodiment described above, the ignition timing of a cylinder having an oil film thickness thinner than the predetermined value is corrected to be advanced. However, when there is a cylinder having an oil film thickness thinner than the predetermined value, an oil pressure, or an oil amount, of the cylinder or every cylinder may be increased, instead of or in addition to the correction of the ignition timing.

Figure 4:
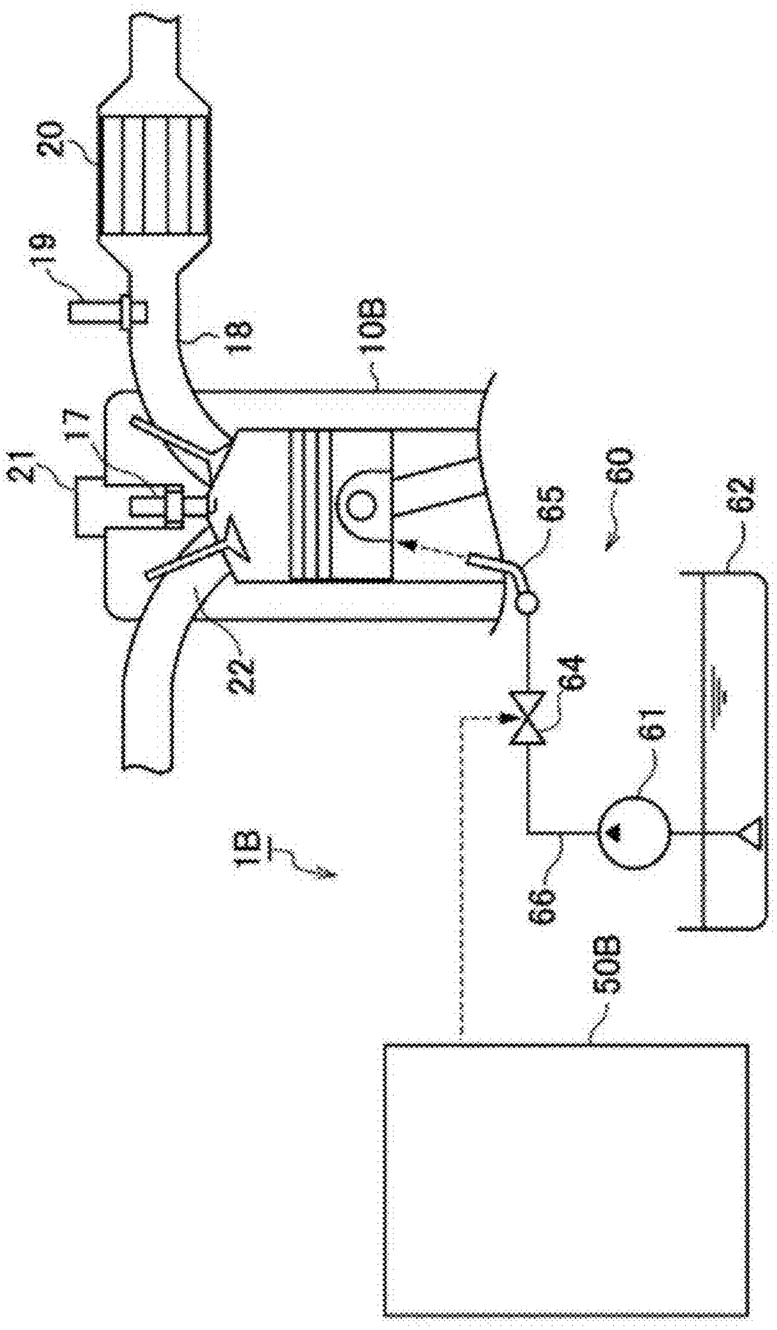
FIG. 4 is a diagram illustrating configurations of an engine control apparatus according to one example embodiment and a main part of an engine to which the engine control apparatus is applied.

Now, a description is given, with reference to FIG. 4, of an engine control apparatus 1B according to a second example embodiment. FIG. 4 is a diagram illustrating configurations of the engine control apparatus 1B and a main part of an engine 10B to which the engine control apparatus 1B is applied. Note that FIG. 4 illustrates only one cylinder of four cylinders. In FIG. 4, the same components as or equivalent components to those of the first example embodiment may be denoted by the same reference numerals.

When increasing an oil pressure, or an oil amount, of only a cylinder having an oil film thickness thinner than a predetermined value, for example, an oil jet circuit, or an each-cylinder oil pressure circuit, 60 that supplies or injects oil to each of the cylinders may be provided, for example, as illustrated in FIG. 4, to control ON/OFF of an oil jet.

For example, the oil jet circuit, or the each-cylinder oil pressure circuit, 60 may pressurize oil stored in an oil pan 62 using an oil pump 61, feed the oil with pressure to a nozzle 65 through an oil passage, or an oil pressure circuit, 66, and inject or supply the oil from the nozzle 65 toward an inner surface of the cylinder, for example. The oil passage, or the oil pressure circuit, 66 may be provided with an on/off valve, or a solenoid valve, 64. The on/off valve 64 may execute and stop, i.e., switch the oil jet. An ECU 50B may control driving, i.e., valve opening and valve closing of the on/off valve 64.

When the oil film thickness is thinner than a predetermined value, for example, the ECU 50B may open the on/off valve 64 of the cylinder to execute the oil jet, i.e., to supply the oil to the cylinder. When the oil film thickness is thicker than the predetermined value, for example, the ECU 50B may close the on/off valve 64 of the cylinder to stop the oil jet, i.e., to stop supplying the oil to the cylinder.

When the oil pressure, or the oil amount, of every cylinder is to be increased, for example, an unillustrated electric oil pump may be provided. The electric oil pump may be driven by an electric motor to pressurize and discharge oil stored in an oil pan. For example, a revolving speed of the electric oil pump may be increased in accordance with a target oil pressure. The revolving speed of the electric oil pump may be equal to a discharge amount. The ECU 50B may control the driving, i.e., the revolving speed of the electric oil pump.

Alternatively, when the oil pressure, or the oil amount, of every cylinder is to be increased, an unillustrated regulator valve, or a control valve, may be provided. The regulator valve may regulate a pressure of the oil discharged from the unillustrated oil pump. A regulatory pressure, i.e., a target oil pressure of the regulator valve, or the control valve, may be increased. Note that, as the regulator valve, or the control valve, a known configuration, e.g., a configuration including a combination of a linear solenoid and a spool valve, for example, may be used. The linear solenoid may displace a valve in accordance with a current value, i.e., a current value corresponding to a target oil pressure applied from the ECU 50B to regulate a control pressure. The spool valve may slidably move in accordance with a balance between pressing force applied by a control pressure generated by the linear solenoid and spring force of a spring to thereby regulate the oil pressure.

Note that other configurations are the same as or similar to the above-described engine control apparatus 1 according to the first example embodiment, and thus a detailed description thereof is omitted here.

Figure 5:
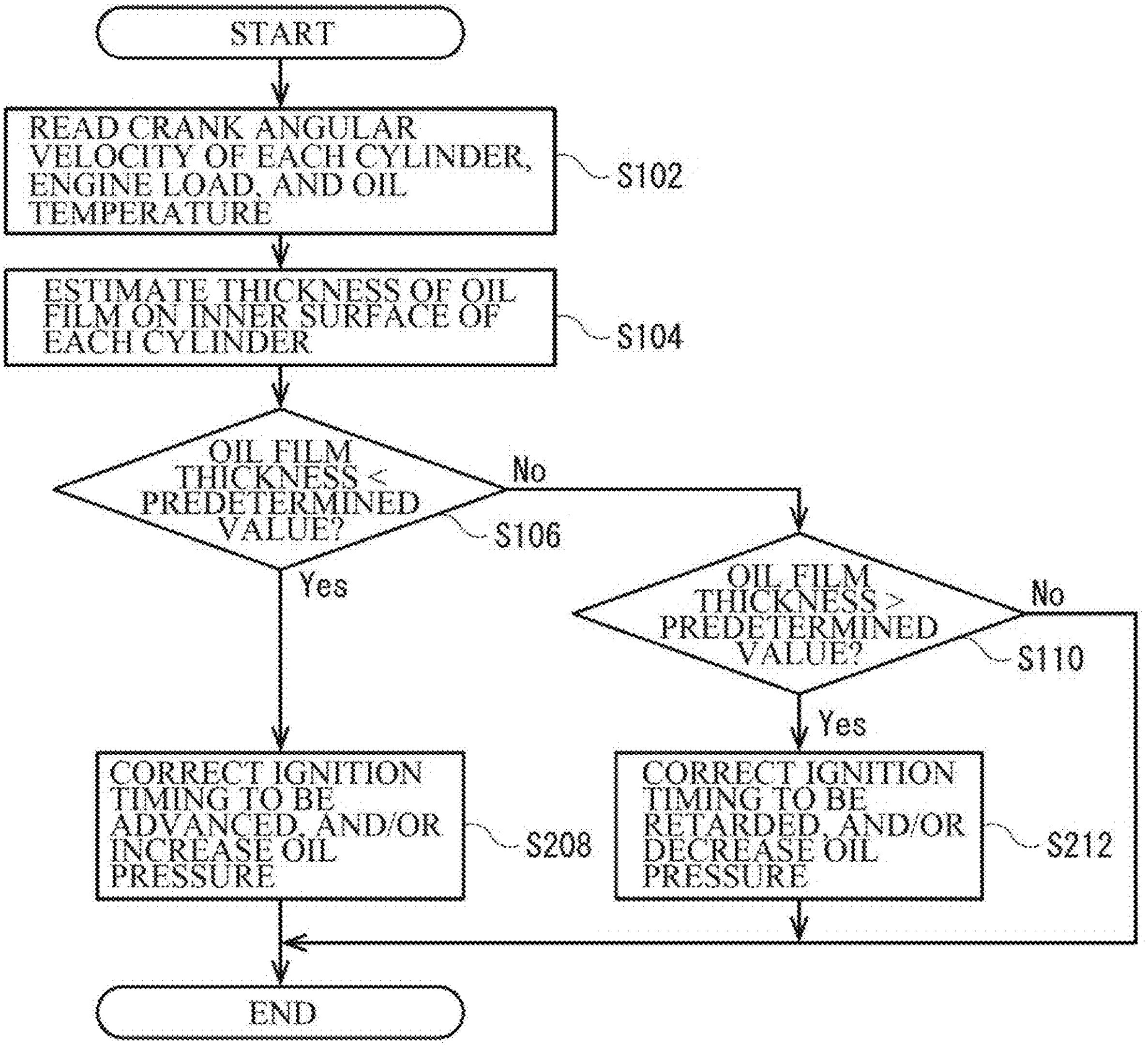
FIG. 5 is a flowchart illustrating a processing procedure of NV reduction control to be performed by the engine control apparatus illustrated in FIG. 4.

Now, a description is given of an operation of the engine control apparatus 1B with reference to FIG. 5. FIG. 5 is a flowchart illustrating a processing procedure of NV reduction control to be performed by the engine control apparatus 1B. The processing may be repeatedly executed in the ECU 50B at a predetermined timing.

First, the contents of the series of processing in steps S102 to S106 and S110 are the same as or similar to those of the first example embodiment described above, and thus detailed descriptions thereof are omitted here.

If it is determined, in step S106, that there is a cylinder having an oil film thickness thinner than the predetermined value (S106: Y), an oil pressure of every cylinder or the cylinder having an oil film thickness thinner than the predetermined value may be increased in step S208, instead of or in addition to the correction of the ignition timing to be advanced. Note that the method of regulating, or a method of increasing, the oil pressure is as described above, and thus a detailed description thereof is omitted here.

If it is determined, in step S110, that there is a cylinder having an oil film thickness thicker than a predetermined value (S110: Y), an oil pressure of every cylinder or a cylinder having an oil film thickness thicker than the predetermined value may be decreased in step S212, instead of or in addition to the correction of the ignition timing to be retarded.

According to the example embodiment, when there is a cylinder having an oil film thickness thinner than the predetermined value, an oil pressure of every cylinder or the cylinder may be increased, i.e., an oil amount may be increased, instead of or in addition to the correction of the ignition timing to be advanced. Accordingly, setting the oil film thickness to an appropriate thickness of, e.g., 4 micrometers to 6 micrometers or more, i.e., increasing the oil film thickness helps to further reduce the noise and the vibration, or the NV, of the body of the engine 10, i.e., to further improve quietness of the body of the engine 10.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

For example, in the example embodiments described above, the NV reduction control is executed in all driving regions. In some embodiments, the execution of the NV reduction control may be limited to idling driving during which quietness is particularly required.

Figure 6:
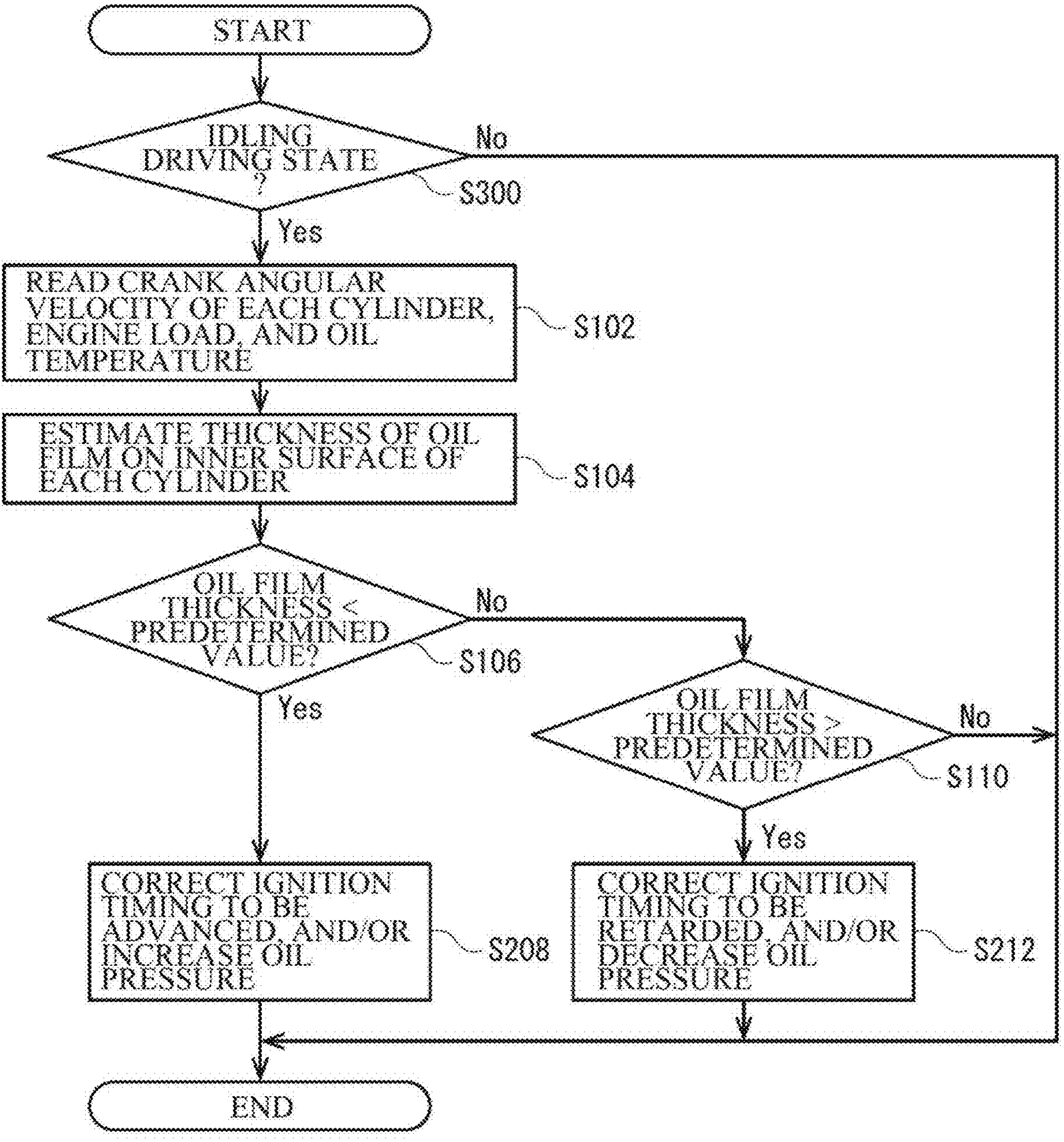
FIG. 6 is a flowchart illustrating a processing procedure of NV reduction control to be performed by an engine control apparatus according to a modification example.

In that case, a determination may be made, in step S300 of FIG. 6, as to whether the engine 10 is in an idling driving state. If the engine 10 is not in the idling driving state (S300: N), the flow may exit temporarily from the processing. If the engine 10 is in the idling driving state (S300: Y), the processing may proceed to step S102.

Contents of the series of processing in or subsequent to step S102 are the same as those of the first example embodiment or the second example embodiment described above, and thus detailed descriptions thereof are omitted here. Note that FIG. 6 is a flowchart illustrating a processing procedure of NV reduction control to be performed by an engine control apparatus according to a modification example.

In the example embodiments described above, the oil film thickness is estimated from the crank angular velocity, the engine load, and the oil temperature. In some embodiments, instead of the above-described method, for example, a sensor that measures an oil film thickness may be used. Examples of the sensor that measures the oil film thickness may include an electric capacitance sensor, an electric resistance sensor, a laser fluorescence sensor, or an optical interference sensor.

In the example embodiments described above, the description has been given by exemplifying a gasoline engine using gasoline as a fuel. In some embodiments, the disclosure is also applicable, for example, to a hydrogen engine using hydrogen as a fuel, or a diesel engine using light oil as a fuel. In the example embodiments described above, the description has been given by exemplifying a naturally aspirated engine, or an NA engine. In some embodiments, the disclosure is also applicable to an engine including a supercharger, such as a turbo engine, for example.

Further, in the example embodiments described above, the description has been given by exemplifying the case where the disclosure is applied to an existing gasoline engine vehicle. In some embodiments, the disclosure is also applicable, for example, to an engine of a hybrid electric vehicle, or an HEV, including an engine and an electric motor as driving force sources.

The limitations in the claims are to be interpreted broadly based on the language employed in the claims and not limited to examples described in this specification or during the prosecution of the application, and the examples are to be construed as non-exclusive.

As used in this specification and the appended claims, the singular forms "a," "an," and "the" include, especially in the context of the claims, are to be construed to cover both the singular and the plural, unless otherwise indicated herein or clearly contradicted by context.

Throughout this specification and the appended claims, unless the context requires otherwise, the terms "comprise", "include", "have", and their variations are to be construed to cover the inclusion of a stated element, integer, or step but not the exclusion of any other non-stated element, integer, or step.

The use of the terms first, second, etc. do not denote any order or importance, but rather the terms first, second, etc. are used to distinguish one element from another.

The term "substantially", "approximately", "about", and its variants having the similar meaning thereto are defined as being largely but not necessarily wholly what is specified as understood by one of ordinary skill in the art.

The term "disposed on/provided on/formed on" and its variants having the similar meaning thereto as used herein refer to elements disposed directly in contact with each other or indirectly by having intervening structures therebetween.

The ECU 50 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the ECU 50. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and an SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of the ECU 50 illustrated in FIG. 1.

The invention claimed is:

1. An engine control apparatus comprising:

an oil film thickness acquirer configured to determine a thickness of an oil film on an inner surface of each of cylinders of an engine; and a processor configured to make a correction of an ignition timing of each of the cylinders in accordance with the determined thickness of the oil film of each of the cylinders.

2. The engine control apparatus according to claim 1, wherein the processor is configured to make a correction of an ignition timing of a cylinder, among the cylinders, comprising a thickness of the oil film that is thinner than a predetermined value, the correction of the ignition timing being made to be advanced.

3. The engine control apparatus according to claim 2, wherein the processor is configured to, when there is the cylinder comprising a thickness of the oil film that is thinner than the predetermined value, increase an oil pressure of the cylinder or oil pressures of all of the cylinders, instead of or in addition to the correction of the ignition timing.

4. The engine control apparatus according to claim 3, wherein the oil film thickness acquirer is configured to estimate the thickness of the oil film of each of the cylinders, based on: a crank angular velocity corresponding to an expansion process of each of the cylinders; an engine load; and an oil temperature.

5. The engine control apparatus according to claim 4, wherein the oil film thickness acquirer is configured to estimate that the thickness of the oil film is thinner as the crank angular velocity increases, estimate that the thickness of the oil film is thinner as the engine load increases, and estimate that the thickness of the oil film is thinner as the oil temperature increases.

6. An engine control apparatus comprising circuitry configured to determine a thickness of an oil film on an inner surface of each of cylinders of an engine, and make a correction of an ignition timing of each of the cylinders in accordance with the determined thickness of the oil film of each of the cylinders.

* * * * *